United States Patent
K

(10) Patent No.: US 11,431,554 B2
(45) Date of Patent: Aug. 30, 2022

(54) MECHANISM FOR CONTROL MESSAGE REDIRECTION FOR SDN CONTROL CHANNEL FAILURES

(71) Applicant: TELEFONAKTIEBOLAGET LM ERICSSON (PUBL), Stockholm (SE)

(72) Inventor: Faseela K, Karnataka (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 52 days.

(21) Appl. No.: 16/961,680

(22) PCT Filed: Jan. 12, 2018

(86) PCT No.: PCT/IN2018/050018
§ 371 (c)(1),
(2) Date: Jul. 11, 2020

(87) PCT Pub. No.: WO2019/138415
PCT Pub. Date: Jul. 18, 2019

(65) Prior Publication Data
US 2021/0377160 A1 Dec. 2, 2021

(51) Int. Cl.
*H04L 12/24* (2006.01)
*H04L 41/0663* (2022.01)
(Continued)

(52) U.S. Cl.
CPC ...... *H04L 41/0663* (2013.01); *H04L 41/0672* (2013.01); *H04L 45/28* (2013.01); *H04L 45/64* (2013.01); *H04L 49/253* (2013.01)

(58) Field of Classification Search
CPC ......... H04L 41/12; H04L 45/22; H04L 45/28; H04L 45/02; H04L 45/38
See application file for complete search history.

(56) References Cited

U.S. PATENT DOCUMENTS

| 9,178,807 B1 | 11/2015 | Chua et al. |
| 9,813,286 B2 | 11/2017 | Fang et al. |
(Continued)

FOREIGN PATENT DOCUMENTS

| WO | 2015167597 A1 | 11/2015 |
| WO | 2016037443 A1 | 3/2016 |

OTHER PUBLICATIONS

T.- Watanabe, T. Omizo, T. Akiyama and K. Iida, "ResilientFlow: Deployments of distributed control channel maintenance modules to recover SDN from unexpected failures," 2015 11th International Conference on the Design of Reliable Communication Networks (DRCN), 2015, pp. 211-218, doi: 10.1109/DRCN.2015.7149015.*

*Primary Examiner* — Chirag R Patel
(74) *Attorney, Agent, or Firm* — Christopher & Weisberg, P.A.

(57) ABSTRACT

A method and system for automatic redirection of control channel messages in response to a control channel failure with a target switch in a software defined networking (SDN) network, the automatic redirection occurring before a topology of the SDN network is updated in response to the control channel failure. The method includes determining whether a control channel message is to be sent to an SDN controller, checking availability of the control channel, selecting a backup port to reach the SDN controller in response to the control channel being unavailable, and forwarding the control channel message to the SDN controller via the backup port.

10 Claims, 9 Drawing Sheets

(51) Int. Cl.
*H04L 41/0654* (2022.01)
*H04L 45/28* (2022.01)
*H04L 45/64* (2022.01)
*H04L 49/253* (2022.01)

(56) References Cited

U.S. PATENT DOCUMENTS

| | | |
|---|---|---|
| 10,237,206 B1 * | 3/2019 | Agrawal ................. H04L 45/28 |
| 2014/0280834 A1 * | 9/2014 | Medved .............. H04L 41/0609 |
| | | 709/223 |
| 2016/0248664 A1 * | 8/2016 | Huang ................... H04L 45/44 |
| 2017/0099217 A1 | 4/2017 | Li et al. |
| 2017/0118066 A1 | 4/2017 | Mathew et al. |
| 2019/0097931 A1 * | 3/2019 | Atli ........................ H04L 47/12 |

\* cited by examiner

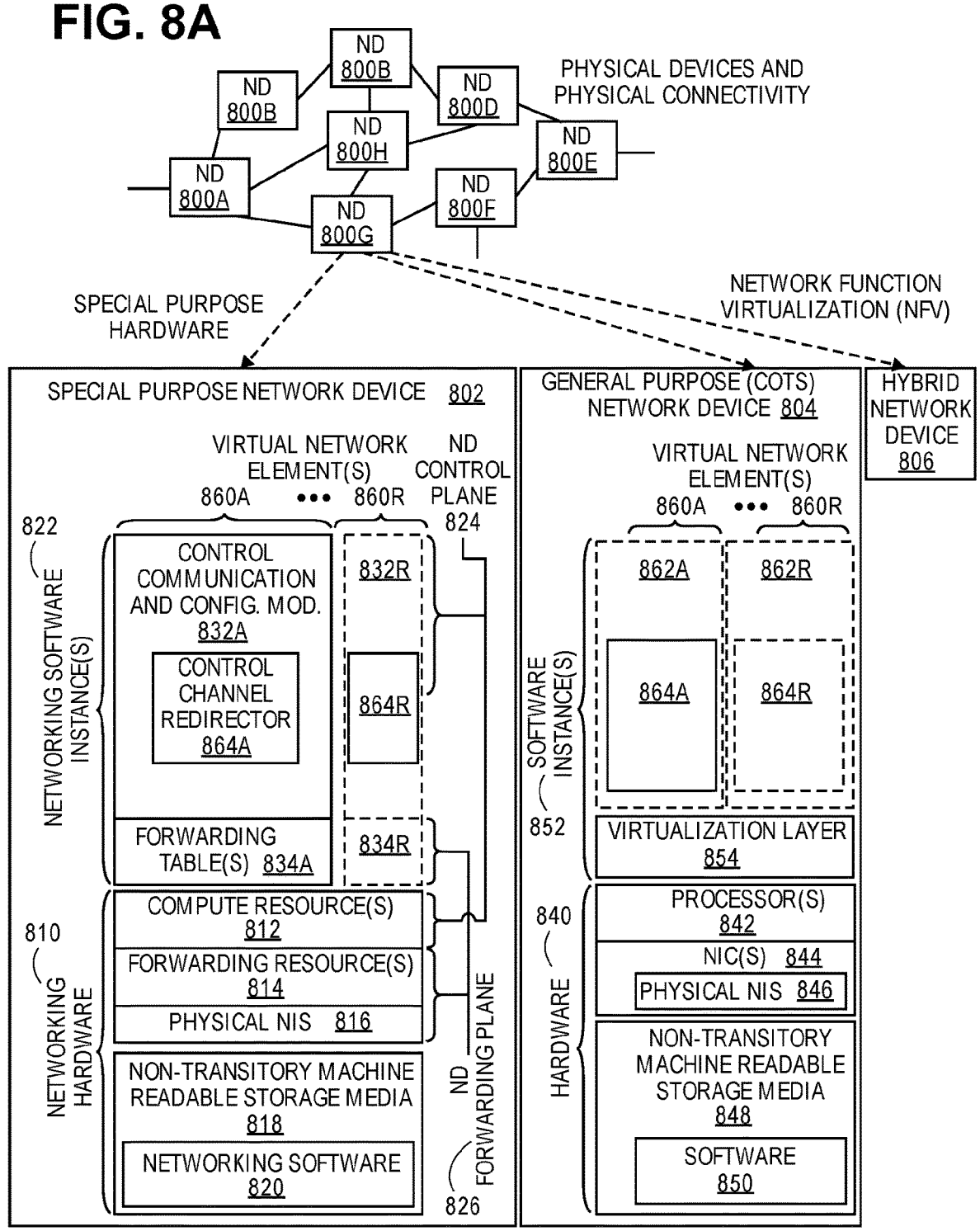

MECHANISM FOR CONTROL MESSAGE REDIRECTION FOR SDN CONTROL CHANNEL FAILURES

TECHNICAL FIELD

Embodiments of the invention relate to the field of software defined networks (SDNs); and more specifically, to the communication of control messages between and SDN controller and SDN data plane nodes.

BACKGROUND

One Software-defined network (SDNs) facilitate rapid and open innovation at the network layer by providing a programmable network infrastructure. SDNs separate control plane functions from data plane functions enabling nodes in the SDN network to be configured by a controller or set of controllers for the SDN network. The nodes in the SDN network implement the data plane and are configured by the controller, which manages the control plane of the SDN network. In this manner the network infrastructure can be updated without having to separately replace or update each of the nodes in the network. This also makes the nodes more cost efficient to maintain as they have lower resource requirements and are less complex keeping them more inexpensive to manufacture and maintain. The complexity in the network is thereby limited to the set of controllers, which are more cost effective to upgrade than the numerous nodes of the data plane of the SDN network. The SDN network can provide standard interfaces for network programming and also provide certain defined semantics for network programming.

A flow control protocol is utilized in the SDN network to manage the control plane communications and configuration of the data plane nodes in the SDN network. Any flow control protocol may be utilized. The OpenFlow switching specification is an example of a flow control protocol. OpenFlow enables dynamic programming of flow control policies in the SDN. Flow control protocols define a basic organization of the operation of the data plane nodes with flow tables that are programmed to implement flow control policies that implement packet forwarding in the SDN network.

Nodes in the data plane communicate with the SDN controller to send information to the SDN controller for processing and to receive configuration, commands and processed data via a control channel. However, in some circumstances the data plane nodes may become disconnected from the SDN controller due to link or node failures in the SDN network or in any path that enables communication between a given node and the SDN controller. Where there is a loss of the with the SDN controller the data plane node may be unable to complete some functions or resolve issues and as a result there may be a disruption in the operation of the disconnected data plane node.

SUMMARY

In one embodiment, a method is implemented by a network device for automatic redirection of control channel messages in response to a control channel failure with a target switch in a software defined networking (SDN) network, the automatic redirection occurring before a topology of the SDN network is updated in response to the control channel failure. The method includes determining whether a control channel message is to be sent to an SDN controller, checking availability of the control channel, selecting a backup port to reach the SDN controller in response to the control channel being unavailable, and forwarding the control channel message to the SDN controller via the backup port.

In a further embodiment, a network device is presented to implement the method for automatic redirection of control channel messages in response to a control channel failure with a target switch in the SDN network where the automatic redirection occurring before a topology of the SDN network is updated in response to the control channel failure. The network device includes a non-transitory computer-readable medium having stored therein a control channel redirector, and a processor coupled to the non-transitory computer-readable medium. The processor is configured to execute the control channel redirector, the control channel redirector to determine whether a control channel message is to be sent to an SDN controller, to check availability of the control channel, to select a backup port to reach the SDN controller in response to the control channel being unavailable, and to forward the control channel message to the SDN controller via the backup port.

In a further embodiment, a computing device implements a plurality of virtual machines, the plurality of virtual machines to implement network function virtualization (NFV), where at least one virtual machine from the plurality of virtual machines implements the method for automatic redirection of control channel messages in response to a control channel failure with a target switch in the SDN network, where the automatic redirection occurring before a topology of the SDN network is updated in response to the control channel failure. The computing device includes a non-transitory computer-readable medium having stored therein a control channel redirector, and a processor coupled to the non-transitory computer-readable medium, the processor configured to the at least one virtual machine, the at least one virtual machine to execute the control channel redirector, the control channel redirector to determine whether a control channel message is to be sent to an SDN controller, to check availability of the control channel, to select a backup port to reach the SDN controller in response to the control channel being unavailable, and to forward the control channel message to the SDN controller via the backup port.

In one embodiment, a control plane device is in communication with a plurality of data plane nodes in the SDN network, where the control plane device implements the method for automatic redirection of control channel messages in response to a control channel failure with a target switch in the SDN network, the automatic redirection occurring before a topology of the SDN network is updated in response to the control channel failure. The control device includes a non-transitory computer-readable medium having stored therein a control channel redirector, and a processor coupled to the non-transitory computer-readable medium. The processor is configured to execute the control channel redirector, the control channel redirector to configure the plurality of nodes to have a set of backup ports to forward control channel messages in response to a detected failure of a primary control channel with the control plane device, to configure the plurality of nodes to handle a back-up switch role by forwarding received control channel messages destined for the control plane device to the control plane device via a control port of the back switch, and to configure the plurality of data plane nodes to handle inbound control channel messages from the control plane device by forwarding the inbound control channel messages to destination data plane nodes.

BRIEF DESCRIPTION OF THE DRAWINGS

The invention may best be understood by referring to the following description and accompanying drawings that are used to illustrate embodiments of the invention. In the drawings:

FIG. 8A illustrates connectivity between network devices (NDs) within an exemplary network, as well as three exemplary implementations of the NDs, according to some embodiments of the invention.

FIG. 8B illustrates an exemplary way to implement a special-purpose network device according to some embodiments of the invention.

DETAILED DESCRIPTION

Figure 1:
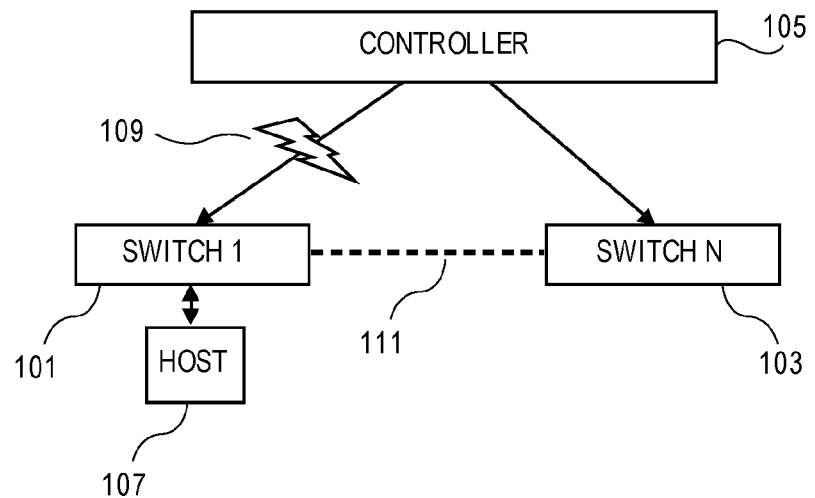
FIG. 1 is a diagram of one example embodiment of an SDN network showing an event that disconnects switch 1 from the controller.

The following description describes methods and apparatus for managing the communication between a software defined networking (SDN) controller and a node or 'switch' in the SDN network. In particular, the embodiments provide a method and system for handling events that cause a disruption in the communication between the SDN switch and controller. The embodiments provide methods and system which enable an SDN switch to communicate with the SDN controller via another SDN switch in the SDN network. This intermediate switch may serve as a proxy to relay communications between the SDN controller and the SDN switch to ensure continued function of the SDN switch until a flow control communication session is re-established between the SDN switch and the SDN controller.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Overview

In the event that the connection between the SDN controller and the SDN switch is broken, without the processes and system provided by the embodiments herein, there is no way for the crucial control channel messages to reach the SDN controller from the SDN switch or for control channel messages from the SDN switch to reach the SDN controller. For example, some critical control channel messages from the SDN switch to the SDN controller (e.g., PACKET_IN messages), which are crucial for data path functioning can be missed or lost during this situation even though the SDN controller is still executing, since no control channel is available for the SDN switch to communicate to the SDN controller. Similarly, there will be critical control channel messages from the SDN controller to the SDN switch (e.g., PACKET-OUT messages) which might be sent in response to control channels messages sent by the SDN switch (e.g., PACKET-In messages) or other messages, which can be lost in such scenarios.

The prior art thus has disadvantages in handling communication issues between SDN controllers and SDN switches. The prior art does not provide a process to send control channel messages (e.g., packet_in/packet-out messages) to the SDN controller when the control channel is down. Even though both the SDN controller and the SDN switch are operating normally, data traffic handled by the SDN switch can be disrupted in such cases due to the lack of capability of the SDN controller and SDN switch to contact each other.

FIG. 1 is a diagram of one embodiment of a basic SDN network with a control channel issue. In the simplified example a first SDN switch 1 101 and a set of other SDN switches (including SDN switch N) 103 are connected to the SDN controller 105. The SDN switches 101, 103 can be any number or type of networking devices. Similarly, the SDN controller may be one of a set of SDN controllers and may be managing any subset of the SDN network (e.g., a cluster) or the entire SDN network. The SDN controller 105 can similarly be any type of computing or networking device.

The SDN switch 1 101 may lose its control channel 109 with the SDN controller 105. In this case, the control channel is lost irrespective of the possible connection 111 with the SDN controller 105 via other SDN switches 103. Utilizing the other connection 111 takes time to resolve and during such resolution of a new path to the SDN controller 105, the SDN switch 1 101 is unable to complete all data traffic handling functions. For example, the host 107 that is connected to the SDN switch 1 101 may be unable to transmit data across the SDN network due to the lack of connectivity 109 causing the SDN switch 101 to be unable to handle data traffic of the host 107.

The embodiments provide a process and system to overcome these limitations of the prior art. The embodiments configure a set of backup switches as proxy for control channel messages. Similarly, a set of back-up ports for the controller port is configured, for example using the OpenFlow configuration protocol, which will be a port that is directed towards the backup or proxy switch. The set of backup ports can be logical ports pointing towards a set of respective backup switches. The backup ports can be used in a SELECT manner (i.e., by flow control selection process) or by FAST FAILOVER (i.e., a process by which the switch immediately reconfigures to use back up ports/paths upon detection of a failure along the primary path without needing to resolve changes in network topology caused by the failure). The embodiments may configure flow control entries in the flow tables (e.g., OpenFlow flow table entries) on the main or 'source' switch and the proxy switches to implement the handling of control channel message (e.g., PACKET-IN and PACKET-OUT) redirection. The embodiments may set some metadata to the redirected control channel messages (e.g., PACKET-Ins), before they are forwarded to the SDN controller, to indicate the path that the control channel message has taken from the source switch to the proxy switch. In some embodiments, the SDN controller may change the primary/secondary backup switches based on the nature of incoming control channel messages. The embodiments also encompass, methods to embed control messages inside a control channel message (e.g., in a packet-out message). In this manner the embodiments enable the redirection of control channel messages (e.g., packet_in/packet_out messages) to and from the SDN controller through a set of back-up switches, whenever the control channel between the SDN controller and a source SDN switch goes down. The embodiments also enable sending the control channel messages (e.g., packet-out messages) from the SDN controller towards the initial source switch through the set of backup switches.

Figure 2:
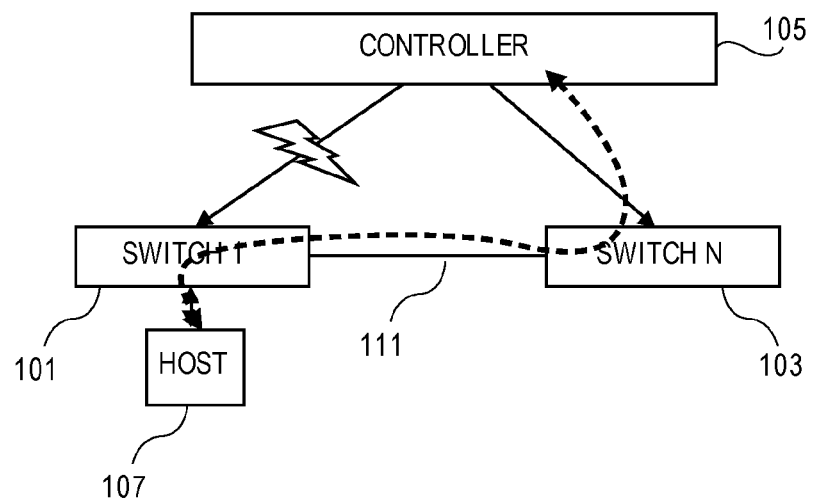
FIG. 2 is a diagram of one embodiment of a disconnected switch communicating with a controller via a proxy switch.

FIG. 2 is a diagram of one embodiment of the SDN network with proxies established for enabling control channel communication in the event of a connection issue. Building on the simple example of FIG. 1, FIG. 2 illustrates the use of a set of proxy SDN switches 103 to redirect control channel messages to the SDN controller 105 in the event of a failure in the primary control channel connection between the source SDN switch 101 and the SDN controller 105. The embodiments, establish a set of back up ports and back up switches that are to be utilized in the event of the failure of the primary control channel path. Thus, the establishment of backup paths and ports is determined in advance of any failure and this enables the source switch to quickly change to the use of the backup ports and backup switches along a path 111 to be able to reach the SDN controller 105 without significant disruption of the function of the source SDN switch 1 101.

Thus, the embodiments provide an advantage over the prior art as they provide a process and system with a robust control channel message handling (e.g., Packet_in/Packet_out message handling) mechanism for SDN switches. The control channel messages (e.g., packet_in/packet_out messages) can be served by the SDN controller even when the primary control channel between a particular switch and the SDN controller goes down. The embodiments provide a robust way of distinguishing between control channel failures and SDN switch shutdown. In addition, the embodiments provide enhanced decision making at the SDN controller for SDN switch recovery, based on the incoming control channel messages.

Configuration of Backup Path and Control Channel Redirection

The embodiments provide a mechanism to redirect the control channel messages (e.g., packet_in messages) from a source SDN switch towards the SDN controller on a different backup path when the control channel experiences a failure. The embodiments provide a mechanism for communication from the SDN controller towards the source SDN switch in response to the receipt of control channel messages along the backup path (e.g., to service the received Packet_in messages from the source SDN switch).

To enable this system and process, the SDN controller can configure a set of backup ports to be controller ports on each switch in the SDN network to use as a backup or proxy for sending control channel messages to the SDN controller (e.g., for sending packet-in messages). The flow control protocol used for configuration can be the OpenFlow protocol or similar configuration protocols like ovsdb, which can be used to configure a set of backup ports for a controller port on a switch. The 'controller port,' is the outbound port used to send control channel messages to the SDN controller. The backup port will be a port facing towards the configured proxy switch or the next hop of a set of proxies for the given source switch. The proxy switch takes responsibility for redirecting the control channel messages (e.g., Packet_in messages) from the source switch as they advance towards the SDN controller in the case the primary control channel connection between the source SDN switch and the SDN controller goes down. If the proxy switch's controller port is not active (i.e., the next proxy switch does not have a functioning control channel as it is not 'LIVE'), then the set of back up ports for the proxy switch can be consulted for one or more levels of indirection. This way, the embodiments provide an M:N redundancy model for control channels in the SDN. The set of backup ports can be used in a SELECT process or FAST FAILOVER process similar to flow control (e.g., OpenFlow) group constructs. This means that one port from the set of backup ports can be chosen based on a load balancing algorithm, or based on a liveness mechanism.

The embodiments include detecting controller port liveness and enabling packet-in redirection at the SDN switches. Whenever a data packet hits an "output:CONTROLLER" action in a flow control table, the actual packet will be wrapped inside a control channel message (e.g., an OpenFlow packet-in message) and then output on the current logical port towards the SDN controller. If a controller port is detected as being in a non-live (i.e., inactive) state due to any reason (e.g., a heartbeat timeout or similar indicator or a disruption in the control channel), the SDN switch can select one backup port from the set of configured backup ports. The control channel message (e.g., a packet-in message) can be then forwarded to the backup switch by setting the packet fields as discussed further herein below.

In the embodiments, this approach can be implemented independent or outside of the flow control pipeline (e.g., outside of the OpenFlow pipeline). Whenever an "output to controller" action is executed by a switch, then a switch internal module (e g, a 'redirector') can detect this action and look up the set of backup ports. In other embodiments, the same functionality can be achieved through the flow control (e.g., OpenFlow) pipeline as well, if liveness detection can be implemented for controller ports within the flow control pipeline. In such cases, a FAST FAILOVER group can be created, with a CONTROLLER port as the first one in the bucket, and the set of back up ports as the remaining buckets. Whenever the CONTROLLER port is in the NON-LIVE the next LIVE port from the bucket will be selected.

In one embodiment, the process enables control inbound channel message (e.g., packet-out message) redirection. Just as with outbound control channel messages bound for the controller (e.g., the packet-in) redirection, if there are independent received control channel messages (e.g., packet-outs) required as in routing protocol cases, the same can be achieved through inbound control channel redirection. For example, if a SDN controller detects that the control channel towards an SDN switch is down, and if there is a packet-out to be sent to that particular SDN switch, then the controller can check for any configured backup-switch for the this SDN switch, and inbound (e.g., packet-out) control channel message can be sent on the channel towards the backup-switch. The required flow control entries will be configured on the back-up switch to realize that this is a control channel message towards another SDN switch, and it will forward the message as is to the destination switch.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 3A:
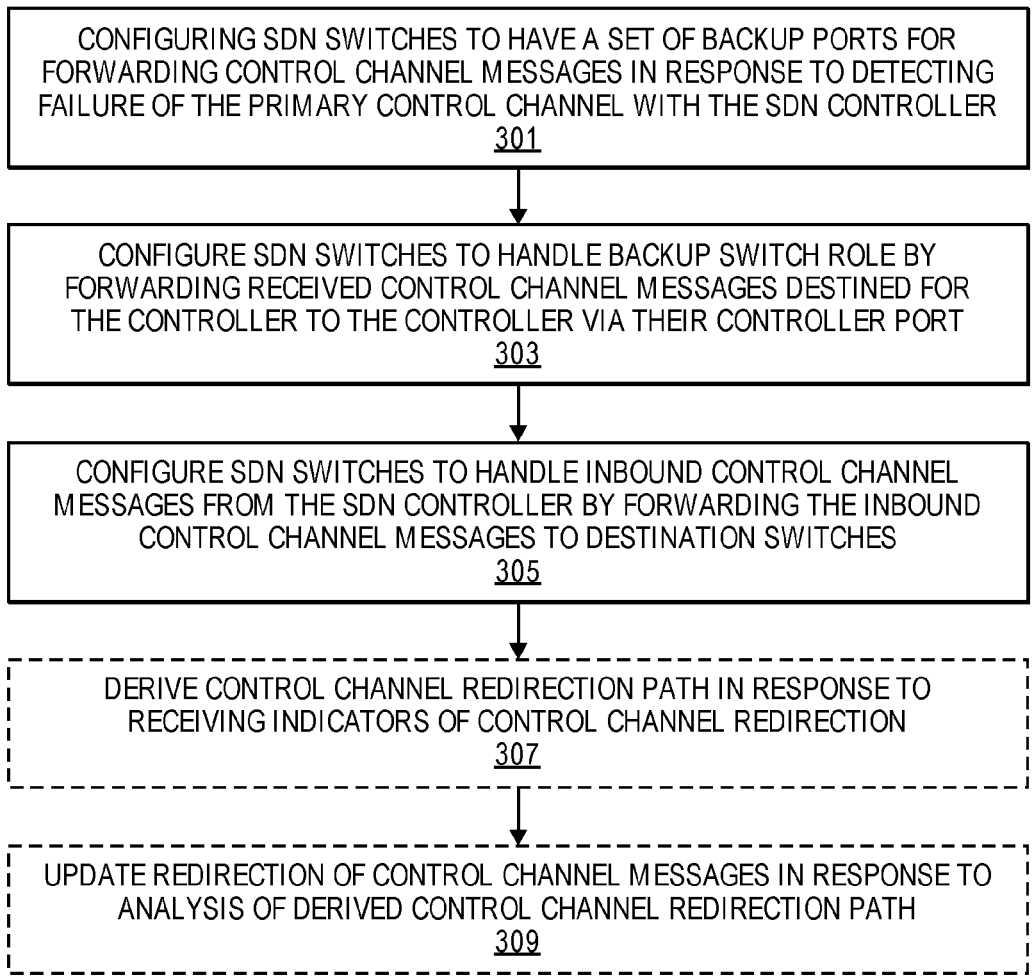
FIG. 3A is a flow chart for the SDN controller to configure redirection of control channel messages.

FIG. 3A is a flow chart for the SDN controller to configure redirection of control channel messages. As discussed above, the SDN switches in the SDN controller are first configured to have a set of backup ports for forwarding control channel messages toward the SDN controller in response to the failure of the primary control channel with the SDN controller (Block 301). This may be configured by creation of a backup port list that is selected by a load balancing algorithm or liveness mechanism. These backup port selections processes can be part of a general redirector mechanism.

The embodiments encompass, configuring flow control (e.g., OpenFlow) entries on the source or originating SDN switch and intermediate backup SDN switches for control channel (e.g., OpenFlow) message redirection. On the backup SDN switches, flow control (e.g., OpenFlow) entries are configured for forwarding all received control channel (e.g., packet-in messages) packets coming from source or originating SDN switches towards the controller (Block 303). The received control channel messages that are destined for the SDN controller are configured to be forwarded toward the controller on the respective controller port. For example, a flow table at the backup switch may be configured to Match on OpenFlow port: 6633, src_IP=originating switch IP, dest_IP=controller IP, action=output to CONTROLLER.

The process further configures the SDN switches to handle return control channel packets from the SDN controllers (Block 305). On the originating switch, a set of control channel message (e.g., using OpenFlow or ovsdb) handling entries are configured to process the control channel messages that are received on ports from proxy switch in NORMAL mode. For example, entries may be created to Match on OpenFlow port: 6633, src_IP=controller IP, dest_IP=switch IP, action=NORMAL or Match on ovsdb port: 6640, src_IP=controller IP, dest_IP=switch IP, action=NORMAL.

In some embodiments, the SDN controller may derive the control channel (e.g., packet-in) redirection path so that the SDN controller can determine the SDN switches that are having control channel disruption (Block 307). This is an optional step that enables the SDN controller to employ intelligent recovery mechanisms for the SDN switches that are having control channel disruption issues. In one example embodiment, at each hop of redirection the backup SDN switches can be configured by the SDN controller to output an indicator (e.g., a CONTROLLER action will be executed) to the SDN controller that a redirected control channel packet has been processed. For example, a packet-in may be generated and encapsulate the received control channel packet. Whenever a packet-in or similar control channel message encapsulation happens, the originating switch adds its IP address as the source IP address for the packet-in or control channel message, before forwarding it to the backup switch. At the backup switch, the control channel message (e.g., a packet-in message) is redirected from source originating SDN switch, and will be again forwarded or "output to CONTROLLER", which in turn results in one more encapsulation (e.g., of the packet-in) with the current backup switch IP address in the outer encapsulation header. At the SDN controller, when the encapsulated control channel message is extracted, the source IP at each level of the encapsulation will provide an indication of the various SDN switches through which the control channel traveled. If a clearer indication of a data path node-id is required, at each switch the respective data path node ID can be stored in the encapsulation (e.g., set in the packet-in cookie field), before forwarding the message toward the SDN controller.

In some embodiments, the SDN controller can use the derived data path of received redirected control channel messages to update primary and secondary backup SDN switches based on the analysis of the data path (309). When incoming redirected control channel messages (e.g., packet-in messages) are analyzed, the SDN controller can check whether for a source SDN switch, if the redirection is taking more hops than expected or needed (e.g., by comparison with an optimal path other than the control channel path). If there is an inefficient redirection occurring, then the SDN controller can decide to change the primary backup switch, that is redirecting the packet-in message to enable a more optimal redirection.

In some embodiment, the SDN controller can enable enabling other types of flow control messages (e.g., OpenFlow/ovsdb messages or configuration) to be forwarded through backup switch in the event of the control channel failure to update the primary/secondary switches (Block 311). Whenever the control channel is down, a full control path between the SDN controller and originating switch via the backup switch is required in case the backup path requires an update. As discussed above, if the redirection related flow entries are configured on the originating and back-up switches, the various flow control (e.g., ovsdb) configuration messages can also reach the originating switch for which control channel is down. This way the backup path can be updated to become more optimal based on the feedback mechanism.

Figure 3B:
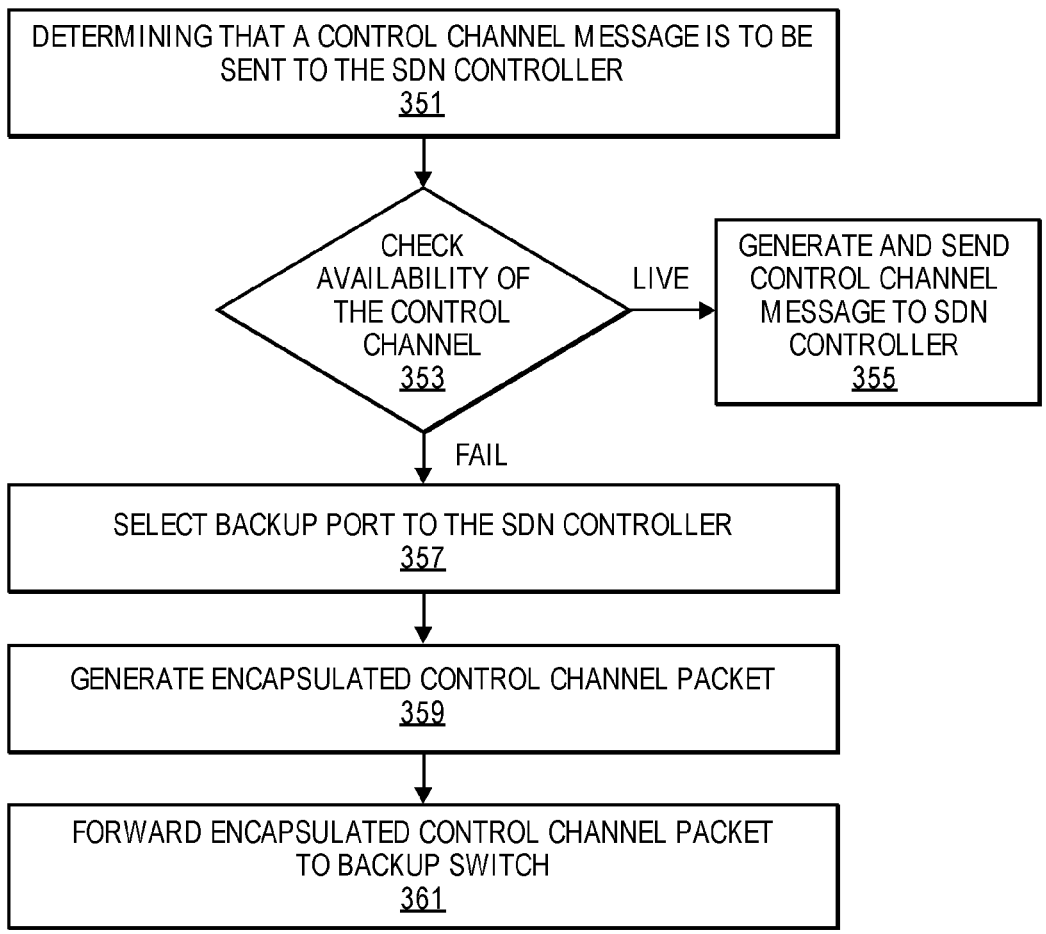
FIG. 3B is a flowchart of one embodiment of the process for redirecting outbound control channel messages at the originating switch in the event of a control channel failure.

FIG. 3B is a flowchart of one embodiment of the process for redirecting outbound control channel messages at the originating switch in the event of a control channel failure. In one embodiment, the process is imitated in the handling of data packets and the flow control process determines that a control channel message is to be sent to the SDN controller (e.g., a packet-in message) (Block 351). A check is then made to determine whether the control channel is available (Block 353). Any process or liveness detection mechanism can be utilized to determine the availability of the control channel. Where the control channel is available then the process continues normally by generating the control channel message and forwarding it to the SDN controller (Block 355). If the control channel is not available, then the process selects a back-up port from the set of available back-up ports configured by the SDN controller (Block 357). The backup ports are pre-configured and any selection mechanism can be used including any fast failover mechanism or load balancing algorithm. The selection of the back-up port does not require that the SDN switch or the SDN controller re-calculate the topology and routing of the SDN network to reach the SDN controller.

The process then encapsulates the control channel message including the originating switch's IP address as a source address for the message (Block 359). The encapsulated control channel message is then forwarded on the backup port (Block 361). An example configuration and algorithm is presented below as pseudocode:

```
Algorithm
Packet entering switch 1 results in a PACKET_IN
If(controller_port is live)
    Do normal processing
Else
    Set src IP = switch IP, dest IP = controller IP, Output the
PACKET_IN message on a backup port from the set of configured
backup ports.
```

Figure 3C:
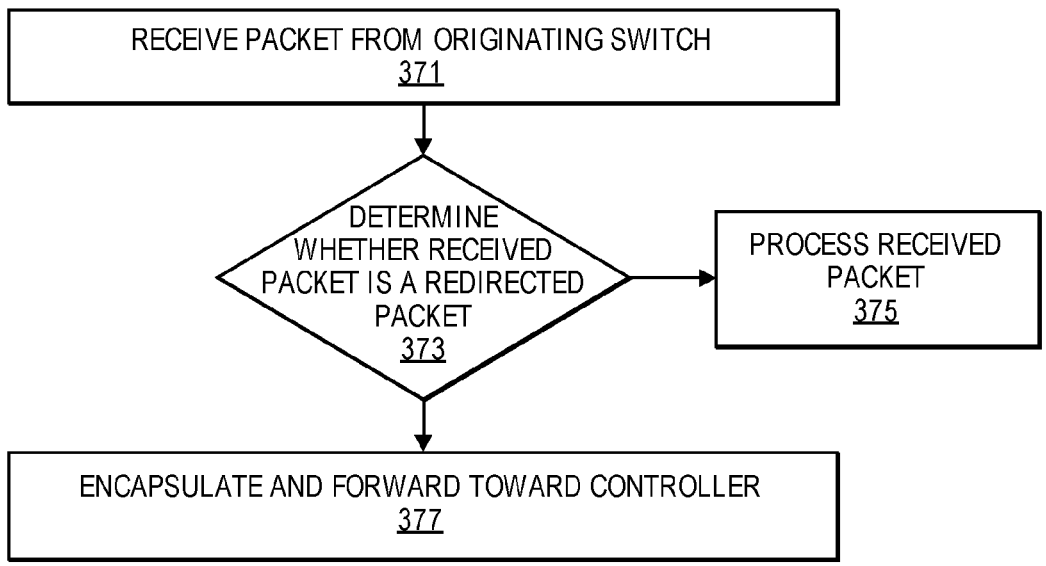
FIG. 3C is a flowchart of one embodiment of the process for redirection implemented by a backup SDN switch.

FIG. 3C is a flowchart of one embodiment of the process for redirection implemented by a backup SDN switch. The backup switch process is initiated when the backup SDN switch receives an encapsulated control channel packet from the originating SDN switch, either directly or indirectly (Block 371). The received packet is analyzed to determine whether it is a redirected control channel message (Block 373). If the packet is not a redirected control channel message, then the received data packet is processed normally by the backup SDN switch (Block 375). If the received packet is a control channel message, then the packet may be re-encapsulated or the encapsulation may be updated to include the source address of the backup SDN switch before being output on the control channel port toward the SDN controller (Block 377). The backup SDN switch can similarly determine the availability of the control channel as with the originating SDN switch as described herein above.

In one example embodiment, the redirection process can be described in pseudocode:

```
Packet reaches backup switch
If(packet_type = OpenFlow && src IP = switch IP, des tip = controller
IP)
    Then Output the packet to controller
Else Packet received by controller and processed
```

Once the packet reaches the SDN controller, the controller sends a control channel response message after (e.g., as an OpenFlow message embedded in a packet_out message) to the back or proxy SDN switch using the appropriate port for that backup SDN switch, which in turn forwards the control channel response towards the originating SDN switch.

At the originating or source SDN switch, upon receipt of the control channel response message, the originating node checks whether received packets are control channel response messages. This check can be described in pseudocode:

```
If(packet_type = OpenFlow && src IP = controller IP, des tip = switch
IP)
Then Perform NORMAL action, and execute the OpenFlow message
```

Thus, the embodiments thereby provide a robust control channel message handling (e.g., for packet_in/packet_out) mechanism for SDN switches. The control channel messages (e.g., packet_in/packet_out messages) can be served by the SDN controller even when the control channel between a particular SDN switch and the SDN controller goes down.

Link Monitoring

As discussed above, SDN is an approach to separate the control plane (which makes routing and switching decisions) from the data plane (that performs the forwarding functions). The data plane is a cluster or network of switches (SDN switches) controlled by the SDN controller and they are interconnected via appropriate links (e.g., L2/L3 links) to form the network topology. It is a function of the SDN controller to maintain the correct view of the data-plane network topology at any given time. The SDN controller relies on periodic monitoring of the data plane (using protocols like the link layer discovery protocol (LLDP)) to maintain the network topology view in real-time. In flow control protocols link OpenFlow based SDN, with LLDP based internal links monitoring, the SDN controller sends LLDP packets on each link periodically in both directions and this process involves the following steps, for each link, the SDN controller constructs an LLDP message and sends it as a control channel message (e.g., a packet-out message) to a source SDN switch. The source SDN switch extracts the LLDP message and forwards it to a destination SDN switch along the designated data-link. The LLDP message is received by the destination SDN switch and forwarded to the SDN controller. The SDN controller receives the control channel message (e.g., a packet-in message), extracts the LLDP message, correlates it with the LLDP message it originated and establishes the link-state of the links that were traversed thereby accumulating link state date to determine the current-topology of the SDN network.

Figure 4:
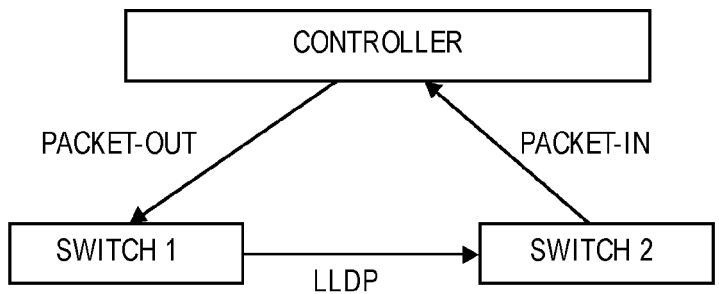
FIG. 4 is a diagram of a SDN network with SDN controller that is using control channel messages and LLDP to determine the SDN network topology.

FIG. 4 is a diagram of a SDN network with SDN controller that is using control channel messages and LLDP to determine the SDN network topology. In the example, the SDN controller sends a control channel message with an LLDP message encapsulated to SDN switch 1. At SDN switch 1, the LLDP message is extracted and sent to SDN switch 2. The LLDP message is received and encapsulated in a control channel message to be sent back to the SDN controller thereby providing link state information for the link between switch 1 and switch 2.

Figure 5:
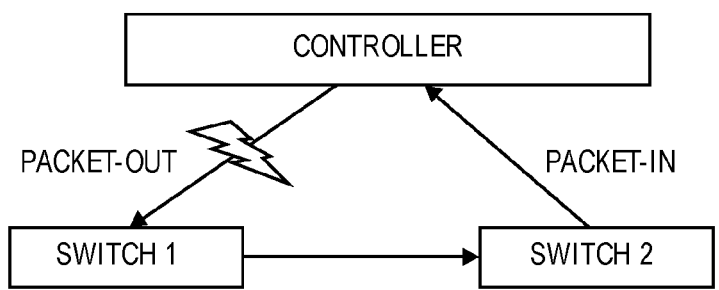
FIG. 5 is a diagram of one example embodiment of an SDN network showing an event that disconnects switch 1 from the controller.

However, as with the embodiments described above, this process encounters problems when there is a failure in a control channel between the SDN controller and an SDN switch as illustrated in FIG. 5. The link monitoring function explained above involves the LLDP packet traversing the control channel (e.g., as a packet-out message), then the data-link as an LLDP message and then the control channel again (e.g., as a packet-in message). In this case, if the control channel session between the SDN controller and either switch 1 or switch 2 is disrupted as shown in FIG. 5, the monitoring flow explained above will be disrupted resulting in faulty data-link failure determination by the SDN controller and thereby causing the SDN network topology view of the SDN controller to be out-of-sync with the actual topology of the SDN network. This is due to the fact that when the SDN controller loses a control channel session with one of the SDN switches, it will not be able to determine if it was only a control-plane disruption or if the SDN switch itself rebooted/crashed/isolated causing data-plane disruption.

The embodiments provided herein are thus further expanded such that when the SDN controller loses a control channel session with and SDN switch (e.g., switch 1 in FIG. 5), the SDN controller stops the periodic monitoring on all links associated with SDN switch 1. Based on the existing topology, the SDN controller sends a probe control channel message (e.g., as a packet-out message) to SDN switch 2. On receiving the probe control channel message, SDN switch 2 sends a probe data-packet on the link towards SDN switch 1. If SDN switch 1 is alive and active, then SDN switch 1 responds to SDN switch 2's probe data packet by appropriately modifying the incoming probe data-packet and sending it back to switch 2 or similarly responding to SDN switch 2 with a probe response message.

SDN switch 2 receives the probe response message and sends a control channel message (e.g., a packet-in message) with the probe response encapsulated from SDN switch 1. The SDN controller correlates the probe response message with SDN switch 1 and determines the link state of the link connecting link between SDN switch 1 and 2 is active, SDN switch 1 is active and thereby updates the topology view for the SDN network.

However, if the SDN switch 1 is down, then no probe response message will be received by the SDN controller or SDN switch 2 and thereby the SDN controller can determine that the link has failed and update the topology view accordingly. In this way, the embodiments help maintain the SDN network topology view at the SDN controller even when the SDN controller loses a control channel connection with certain SDN switches in the SDN network. In some embodiments, this process can be implemented without modifications or extensions to flow control protocols (e.g., the OpenFlow protocol).

Figure 6:
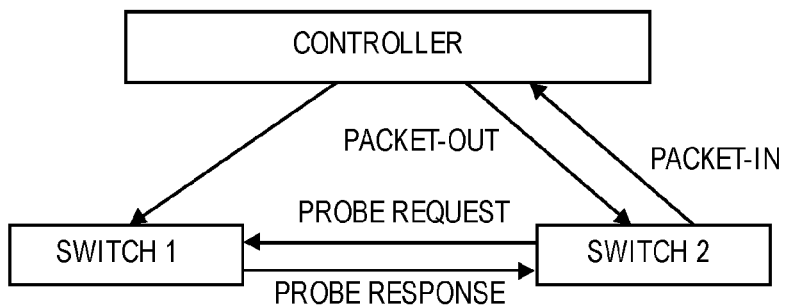
FIG. 6 is a diagram of one embodiment of the link state monitoring process.

FIG. 6 is a diagram of one embodiment of the link state monitoring process. The embodiments include variations in the processes to determine link status using the probe messages for L3/L2 Links. Each example process is described in relation to FIG. 6. FIG. 6 shows a simplified SDN network configuration where switch 1 has lost its control channel connection with the SDN controller. However, switch 1 is able to reach the SDN controller via switch 2. In some embodiments, switch 2 also acts as a backup or proxy switch as described herein above.

Figure 7A:
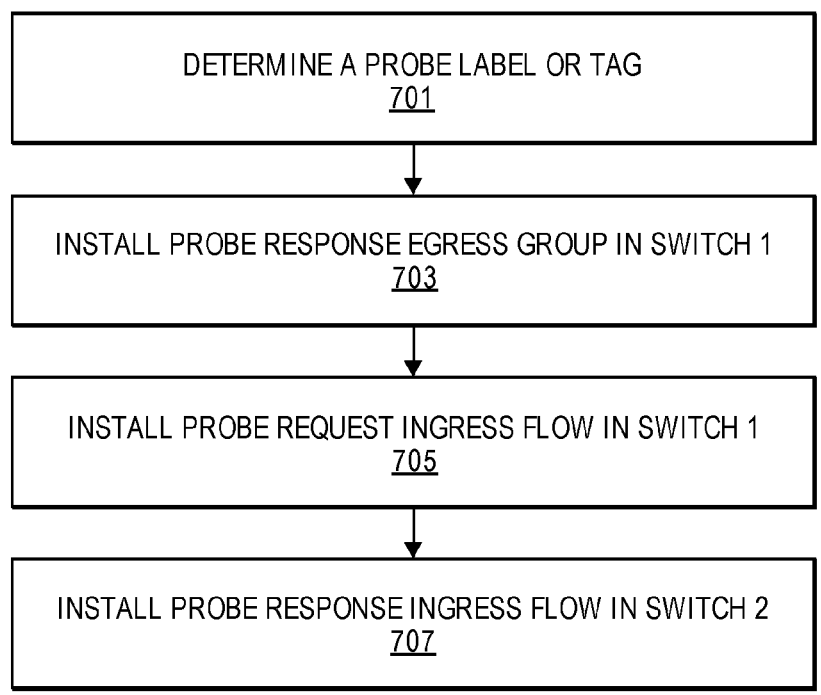
FIG. 7A is a flowchart of one embodiment of a process for initial control plane steps for probing a link in the SDN network.

FIG. 7A is a flowchart of one embodiment of a process for initial control plane steps for probing a link in the SDN network. The flowchart is general to either a Layer 2 or Layer 3 implementation. Layer 2 is the transport layer of the network, while Layer 3 is the network layer of the SDN network and may use a protocol such as the Internet Protocol (IP) for communication. The process involves determining a label or tag for the probe message to be sent to switch that has lost its control channel session with the SDN controller (Block 701). The controller then installs a probe response configuration in the flow tables of the target switch (switch 1) to handle the sending of probe response (Block 703). The controller configures switch 1 to handle the receipt of the probe message (e.g., from switch 2) (Block 705). The controller configures intermediate switches (e.g., the backup switch) to handle the probe message sent by the controller (Block 707).

In the example of a L3 Link implementation the initial control plane steps determine a probe message multi-protocol label switching (MPLS) label to be used for the probe message, which can be configurable. The controller installs a probe response egress group in the target switch (i.e., switch 1 in the example of FIG. 6). The controller adds an entry in a flow control (e.g., OpenFlow) Group Table with a single bucket with the following actions, set a source IP address (Src_IP) as switch 1 IP and a destination (Dest_IP) address as switch 2 IP, set a source media access control address (Src MAC) as the switch 1 MAC address and the Dest MAC as the MAC address of the next-hop switch towards switch 2 (and the controller). Set the output port towards the next-hop switch.

The controller also installs a probe request Ingress Flow in switch 1. As part of this process, it adds an entry in OpenFlow Table 0 with match fields: probe MPLS label, source IP(IP address of switch 2), identifies the incoming packet as a probe packet from Switch 2, and instruction: Goto probe response egress group.

The controller similarly installs a probe response ingress flow in switch 2. The controller adds an entry in OpenFlow Table 0 with match fields: MPLS probe label, source IP (IP address of switch 1), and instruction forward to controller.

This example of the control plane configuration is given in relation to the simplified SDN network of FIG. 6. One skilled in the art would understand that the Layer 3 control plane configuration with this context is given by way of example and not limitation and that the principles, processes and structures are applicable to other contexts.

A similar control plane configuration is implemented for Layer 2 of the network by the controller. Probing a L2 ink involves the following steps to set up the control plane. The controller determines a provider backbone bridge (PBB) probe service identifier (ISID) tag to be used for the probe, which can be configurable. The controller installs a probe response egress group in switch 1. The controller adds an entry in the flow control (e.g., OpenFlow) group table with a single bucket with the following actions to set a Src MAC as switch 1 MAC and a Dest MAC as the MAC address of switch 2 and to output action port on the port towards the switch 2.

The controller also installs a probe request ingress flow in switch 1. The controller adds an entry in flow control (e.g., OpenFlow) table 0 with match fields being the PBB ISID Tag, source MAC (MAC address of switch 2), which identifies incoming packet as a probe packet from switch 2 and instructions to Goto the probe response egress group.

The controller installs a probe response ingress flow in switch 2. This involves adding an entry in the flow control (e.g., OpenFlow) table 0 with match fields of PBB probe ISID tag, source MAC (MAC address of switch 1), and instructions to forward the packet to the controller.

This example of the control plane configuration is given in relation to the simplified SDN network of FIG. 6. One skilled in the art would understand that the Layer 2 control plane configuration with this context is given by way of example and not limitation and that the principles, processes and structures are applicable to other contexts.

Figure 7B:
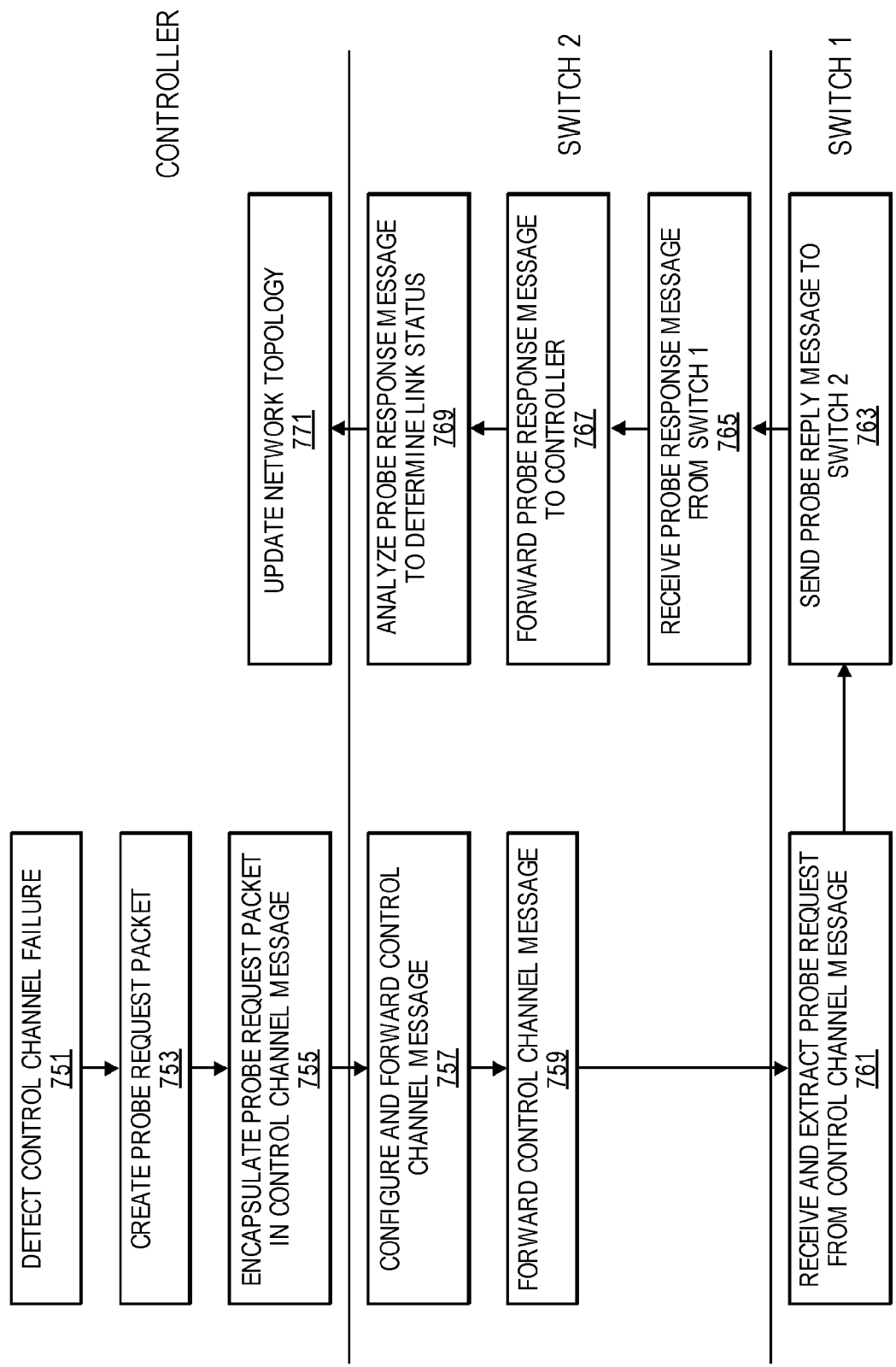
FIG. 7B is a flowchart of a generalized description of the process implemented in response to a lost control channel for a given switch in the SDN network.

FIG. 7B is a flowchart of a generalized description of the process implemented in response to a lost control channel for a given switch in the SDN network. The process illustrated is generalized and specific L3/L2 implementations are detailed below. The process begins with the controller detecting a control channel failure with a given switch in the SDN network (Block 751). The SDN controller can determine the control channel failure using any mechanism including liveness checks or receiving control channel communications via proxies as discussed herein above. The generates a probe request message to be sent to the target SDN switch with which control channel communication has been lost (Block 753). The process then encapsulates the probe request message within a control channel message such as packet_out message (Block 755). This control channel message may be further modified, such as with regard to its meta data and then forwarded toward the target switch via an alternate path/switch (Block 757).

The intermediate switch (e.g., switch 2 of FIG. 6) receives the control channel message and forwards it to the target switch (e.g., switch 1 of the FIG. 6) (Block 759). The target switch then receives the control channel message with the encapsulated probe request message (Block 761). The probe request is analyzed and a probe reply message is generated and sent back to the intermediate switch (Block 763). The intermediate switch receives the probe response message (Block 765) and encapsulates it as a control channel message to be sent to the controller (Block 767).

The controller receives the control channel message and analyzes the probe response information (Block 769). The probe response information can then be used to determine and update the network topology of the SDN network (Block 771). The receipt of the probe response indicates that the target switch is active and that the link between the target switch and the intermediate switch is functioning.

For layer 3 the following steps may be implemented when a control channel session is lost with a target switch (e.g., switch 1). The controller generates a packet-out message and sends it to the intermediate switch (e.g., switch 2). Specifically, the controller creates a 'dummy' L3 packet with a src_IP of the switch 2 IP address and a dest_IP as the switch 1 IP address. The controller encapsulates the dummy L3 packet in a packet-out message. The following actions in packet-out message are specified, to push an MPLS header to the dummy packet, to set a Tag Probe MPLS Label to the dummy packet, and to output port action for the port towards switch 1. The controller then sends the packet-out message to switch 2, which sends the dummy packet towards switch 1.

At the intermediate (switch 2) switch, the switch receives and forwards the dummy packet to switch 1. At switch 1 the dummy packet (i.e., the probe request) is processed. Based on flow Table 0 entry in switch 1, a match is made on the probe MPLS label and src_IP (i.e., the switch 2 IP address). In response to the match, switch 1 sends a packet to the probe response egress group. As part of the probe response egress group, the process sets the source and destination IP address, source and destination MAC address as specified in the actions and sends out on appropriate port to send the packet to the next-hop towards intermediate switch 2.

At the intermediate switch, the switch is configured to receive and handle the probe response. Based on Table 0 entry in switch 1, a match or comparison of the probe MPLS label and source IP address (e.g., switch 1 IP address) is made. If the values matched, the packet is forwarded to the controller.

At the controller, on receiving the probe response as a packet in, the controller checks the probe MPLS label, source and destination IP to determine that the link between switch 1 and 2 is functioning. The controller then updates a topology link as being in an UP state for the link between switch 1 and 2. If no packet-in was received for a packet-out sent to test that link and target switch, then the controller would update the topology link as DOWN for the link between switch 1 and 2.

This example of the data plane operation is given in relation to the simplified SDN network of FIG. 6. One skilled in the art would understand that the Layer 3 data plane operation with this context is given by way of example and not limitation and that the principles, processes and structures are applicable to other contexts.

For layer 2, the following process is used when a control channel session lost with a target switch (e.g., switch 1). The controller generates a packet-out or similar control channel message and sends it to switch 2. Specifically, the controller creates a dummy L2 frame with the source MAC as switch 2 and the destination MAC address as switch 1. The controller encapsulates the dummy L2 frame in a packet-out message or similar control channel message. The controller specifies the following actions for the packet-out message or similar control channel message, to push a PBB header to the dummy frame, to set a tag probe ISID tag to the dummy frame, and to output port action for a port towards switch 1.

The controller sends this control channel message (packet-out message) to switch 2, which sends the dummy frame towards Switch 1.

The forwarded frame is then received and handled by the target switch (switch 1). The dummy frame (i.e., a probe request) is processed by the flow control pipeline of the target switch. Based on flow Table 0 entry in switch 1, a match of PBB probe ISID label and source MAC (switch 2 MAC address) is made. If a match is found, then the target switch sends a frame to a probe response egress group to thereby create the probe response. As part of the probe response egress group, the process sets the source and destination MAC addresses for the frame as specified in the actions and sends out the frame on an appropriate port to send the frame to the intermediate switch (switch 2).

The intermediate switch receives and handles the probe response. The received frame (probe response) is processed in the flow control pipeline based on Table 0 entry in switch 2, which is matched on the PBB Probe ISID tag and source MAC of switch 1. If a match is found, then the frame is forwarded to the controller as a control channel message (e.g., packet-in message).

At the controller, the received control channel message (e.g., packet-in message) is processed. On receiving the frame, a check of the PBB Probe ISID tag, source and destination MAC is made to determine whether the link between target switch 1 and intermediate switch 2 is functioning and if the target switch is live. If the link and switch are functioning, then the controller updates the topology link state as UP between switch 1 and switch 2. If no response frame was received (i.e., no packet-in received) for a given packet-out, then the controller updates the topology link as DOWN between switch 1 and switch 2.

This example of the data plane operation is given in relation to the simplified SDN network of FIG. 6. One skilled in the art would understand that the Layer 2 data plane operation with this context is given by way of example and not limitation and that the principles, processes and structures are applicable to other contexts.

Thus, the link monitoring embodiments provide a process and system when control connectivity is lost between a switch and controller that for every link terminating in that switch, sends probes from the switch at the other end of each of the links connecting to the target switch. If the target switch is alive, the remote switch gets a probe response that is punted to the controller. The controller can determine the link state based on the packet-in received.

FIG. 8A illustrates connectivity between network devices (NDs) within an exemplary network, as well as three exemplary implementations of the NDs, according to some embodiments of the invention. FIG. 8A shows NDs 800A-H, and their connectivity by way of lines between 800A-800B, 800B-800C, 800C-800D, 800D-800E, 800E-800F, 800F-800G, and 800A-800G, as well as between 800H and each of 800A, 800C, 800D, and 800G. These NDs are physical devices, and the connectivity between these NDs can be wireless or wired (often referred to as a link). An additional line extending from NDs 800A, 800E, and 800F illustrates that these NDs act as ingress and egress points for the network (and thus, these NDs are sometimes referred to as edge NDs; while the other NDs may be called core NDs).

Two of the exemplary ND implementations in FIG. 8A are: 1) a special-purpose network device 802 that uses custom application-specific integrated-circuits (ASICs) and a special-purpose operating system (OS); and 2) a general-purpose network device 804 that uses common off-the-shelf (COTS) processors and a standard OS.

The special-purpose network device 802 includes networking hardware 810 comprising a set of one or more processor(s) 812, forwarding resource(s) 814 (which typically include one or more ASICs and/or network processors), and physical network interfaces (NIs) 816 (through which network connections are made, such as those shown by the connectivity between NDs 800A-H), as well as non-transitory machine-readable storage media 818 having stored therein networking software 820. During operation, the networking software 820 may be executed by the networking hardware 810 to instantiate a set of one or more networking software instance(s) 822. Each of the networking software instance(s) 822, and that part of the networking hardware 810 that executes that network software instance (be it hardware dedicated to that networking software instance and/or time slices of hardware temporally shared by that networking software instance with others of the networking software instance(s) 822), form a separate virtual network element 830A-R. Each of the virtual network element(s) (VNEs) 830A-R includes a control communication and configuration module 832A-R (sometimes referred to as a local control module or control communication module) and forwarding table(s) 834A-R, such that a given virtual network element (e.g., 830A) includes the control communication and configuration module (e.g., 832A), a set of one or more forwarding table(s) (e.g., 834A), and that portion of the networking hardware 810 that executes the virtual network element (e.g., 830A).

The special-purpose network device 802 is often physically and/or logically considered to include: 1) a ND control plane 824 (sometimes referred to as a control plane) comprising the processor(s) 812 that execute the control communication and configuration module(s) 832A-R; and 2) a ND forwarding plane 826 (sometimes referred to as a forwarding plane, a data plane, or a media plane) comprising the forwarding resource(s) 814 that utilize the forwarding table(s) 834A-R and the physical NIs 816. By way of example, where the ND is a router (or is implementing routing functionality), the ND control plane 824 (the processor(s) 812 executing the control communication and configuration module(s) 832A-R) is typically responsible for participating in controlling how data (e.g., packets) is to be routed (e.g., the next hop for the data and the outgoing physical NI for that data) and storing that routing information in the forwarding table(s) 834A-R, and the ND forwarding plane 826 is responsible for receiving that data on the physical NIs 816 and forwarding that data out the appropriate ones of the physical NIs 816 based on the forwarding table(s) 834A-R.

FIG. 8B illustrates an exemplary way to implement the special-purpose network device 802 according to some embodiments of the invention. FIG. 8B shows a special-purpose network device including cards 838 (typically hot pluggable). While in some embodiments the cards 838 are of two types (one or more that operate as the ND forwarding plane 826 (sometimes called line cards), and one or more that operate to implement the ND control plane 824 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 836 (e.g., a first full mesh coupling the line cards and a second full mesh coupling all of the cards).

Returning to FIG. 8A, the general-purpose network device 804 includes hardware 840 comprising a set of one or more processor(s) 842 (which are often COTS processors) and physical NIs 846, as well as non-transitory machine-readable storage media 848 having stored therein software 850. During operation, the processor(s) 842 execute the software 850 to instantiate one or more sets of one or more applications 864A-R. While one embodiment does not implement virtualization, alternative embodiments may use different forms of virtualization. For example, in one such alternative embodiment the virtualization layer 854 represents the kernel of an operating system (or a shim executing on a base operating system) that allows for the creation of multiple instances 862A-R called software containers that may each be used to execute one (or more) of the sets of applications 864A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 854 represents a hypervisor (sometimes referred to as a virtual machine monitor (VMM)) or a hypervisor executing on top of a host operating system, and each of the sets of applications 864A-R is run on top of a guest operating system within an instance 862A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 840, directly on a hypervisor (in which case the unikernel is sometimes described as running within a LibOS virtual machine), or in a software container, embodiments can be implemented fully with unikernels running directly on a hypervisor represented by virtualization layer 854, unikernels running within software containers represented by instances 862A-R, or as a combination of unikernels and the above-described techniques (e.g., unikernels and virtual machines both run directly on a hypervisor, unikernels and sets of applications that are run in different software containers).

The instantiation of the one or more sets of one or more applications 864A-R, as well as virtualization if implemented, are collectively referred to as software instance(s) 852. Each set of applications 864A-R, corresponding virtualization construct (e.g., instance 862A-R) if implemented, and that part of the hardware 840 that executes them (be it hardware dedicated to that execution and/or time slices of hardware temporally shared), forms a separate virtual network element(s) 860A-R. In the embodiments, the applications 864A-R can include control channel redirector 864A-R, which implements any combination or collection of the functions described herein above with relation to the embodiments for control channel redirection and probing processes at the network devices.

The virtual network element(s) 860A-R perform similar functionality to the virtual network element(s) 830A-R— e.g., similar to the control communication and configuration module(s) 832A and forwarding table(s) 834A (this virtualization of the hardware 840 is sometimes referred to as network function virtualization (NFV)). Thus, NFV may be used to consolidate many network equipment types onto industry standard high-volume server hardware, physical switches, and physical storage, which could be located in Data centers, NDs, and customer premise equipment (CPE). While embodiments of the invention are illustrated with each instance 862A-R corresponding to one VNE 860A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 862A-R to VNEs also apply to embodiments where such a finer level of granularity and/or unikernels are used.

In certain embodiments, the virtualization layer 854 includes a virtual switch that provides similar forwarding services as a physical Ethernet switch. Specifically, this virtual switch forwards traffic between instances 862A-R and the physical NI(s) 846, as well as optionally between the instances 862A-R; in addition, this virtual switch may enforce network isolation between the VNEs 860A-R that by policy are not permitted to communicate with each other (e.g., by honoring virtual local area networks (VLANs)).

The third exemplary ND implementation in FIG. 8A is a hybrid network device 806, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 802) could provide for para-virtualization to the networking hardware present in the hybrid network device 806.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 830A-R, VNEs 860A-R, and those in the hybrid network device 806) receives data on the physical NIs (e.g., 816, 846) and forwards that data out the appropriate ones of the physical NIs (e.g., 816, 846). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 8C:
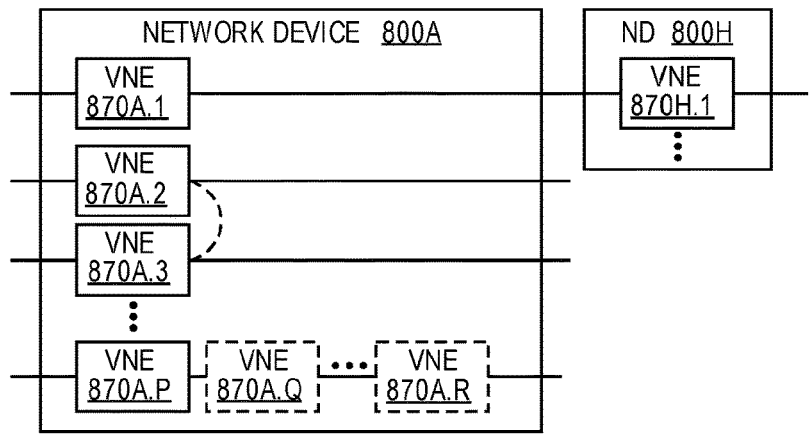
FIG. 8C illustrates various exemplary ways in which virtual network elements (VNEs) may be coupled according to some embodiments of the invention.

FIG. 8C illustrates various exemplary ways in which VNEs may be coupled according to some embodiments of the invention. FIG. 8C shows VNEs 870A.1-870A.P (and optionally VNEs 870A.Q-870A.R) implemented in ND 800A and VNE 870H.1 in ND 800H. In FIG. 8C, VNEs 870A.1-P are separate from each other in the sense that they can receive packets from outside ND 800A and forward packets outside of ND 800A; VNE 870A.1 is coupled with VNE 870H.1, and thus they communicate packets between their respective NDs; VNE 870A.2-870A.3 may optionally forward packets between themselves without forwarding them outside of the ND 800A; and VNE 870A.P may optionally be the first in a chain of VNEs that includes VNE 870A.Q followed by VNE 870A.R (this is sometimes referred to as dynamic service chaining, where each of the VNEs in the series of VNEs provides a different service— e.g., one or more layer 4-7 network services). While FIG. 8C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 8A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 8A may also host one or more such servers (e.g., in the case of the general purpose network device 804, one or more of the software instances 862A-R may operate as servers; the same would be true for the hybrid network device 806; in the case of the special-purpose network device 802, one or more such servers could also be run on a virtualization layer executed by the processor(s) 812); in which case the servers are said to be co-located with the VNEs of that ND.

A virtual network is a logical abstraction of a physical network (such as that in FIG. 8A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 8D:
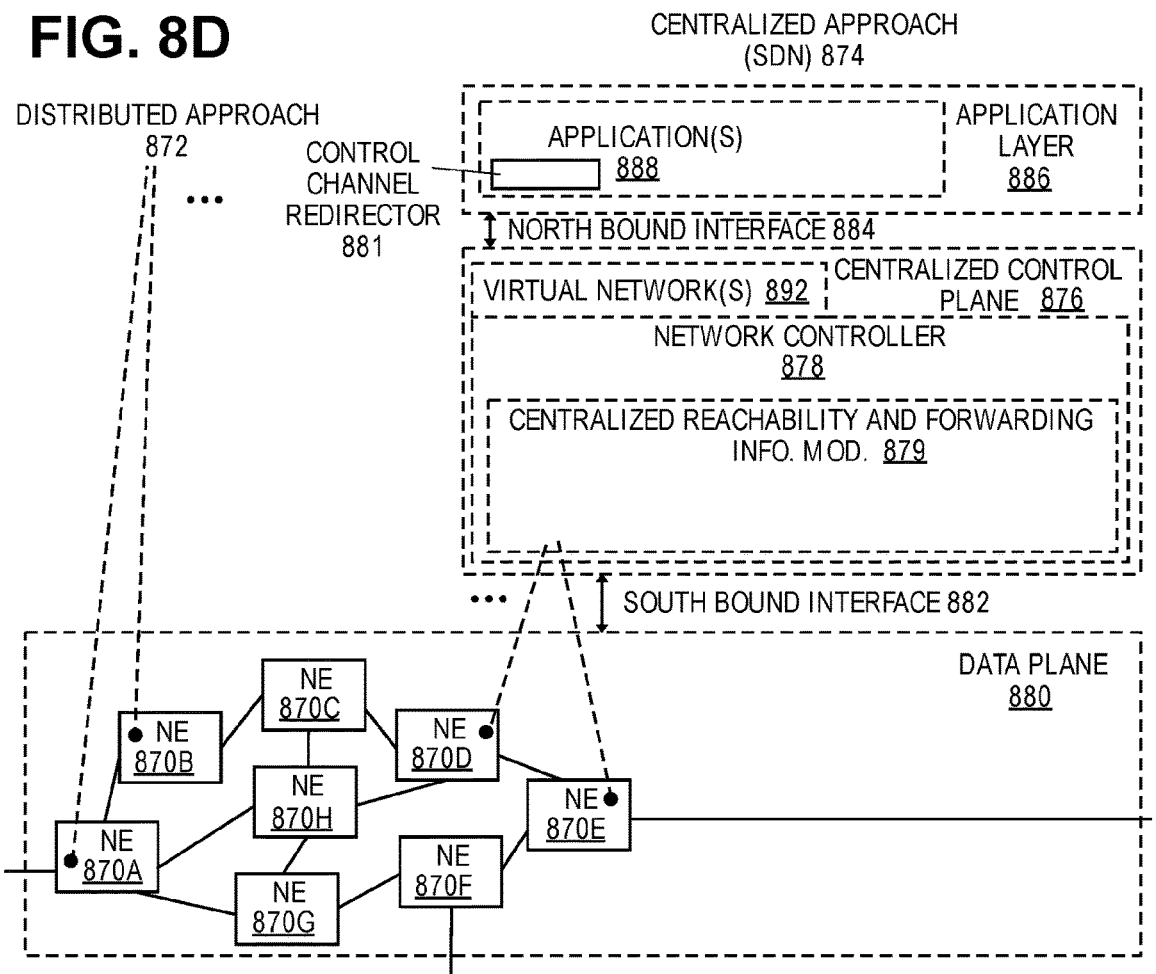
FIG. 8D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 8D illustrates a network with a single network element on each of the NDs of FIG. 8A, and within this straight forward approach contrasts a traditional distributed approach (commonly used by traditional routers) with a centralized approach for maintaining reachability and forwarding information (also called network control), according to some embodiments of the invention. Specifically, FIG. 8D illustrates network elements (NEs) 870A-H with the same connectivity as the NDs 800A-H of FIG. 8A.

FIG. 8D illustrates that the distributed approach 872 distributes responsibility for generating the reachability and forwarding information across the NEs 870A-H; in other words, the process of neighbor discovery and topology discovery is distributed.

For example, where the special-purpose network device 802 is used, the control communication and configuration module(s) 832A-R of the ND control plane 824 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 870A-H (e.g., the processor(s) 812 executing the control communication and configuration module(s) 832A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 824. The ND control plane 824 programs the ND forwarding plane 826 with information (e.g., adjacency and route information) based on the routing structure(s). For example, the ND control plane 824 programs the adjacency and route information into one or more forwarding table(s) 834A-R (e.g., Forwarding Information Base (FIB), Label Forwarding Information Base (LFIB), and one or more adjacency structures) on the ND forwarding plane 826. For layer 2 forwarding, the ND can store one or more bridging tables that are used to forward data based on the layer 2 information in that data. While the above example uses the special-purpose network device 802, the same distributed approach 872 can be implemented on the general-purpose network device 804 and the hybrid network device 806.

FIG. 8D illustrates that a centralized approach 874 (also known as software defined networking (SDN)) that decouples the system that makes decisions about where traffic is sent from the underlying systems that forwards traffic to the selected destination. The illustrated centralized approach 874 has the responsibility for the generation of reachability and forwarding information in a centralized control plane 876 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 876 has a south bound interface 882 with a data plane 880 (sometime referred to the infrastructure layer, network forwarding plane, or forwarding plane (which should not be confused with a ND forwarding plane)) that includes the NEs 870A-H (sometimes referred to as switches, forwarding elements, data plane elements, or nodes). The centralized control plane 876 includes a network controller 878, which includes a centralized reachability and forwarding information module 879 that determines the reachability within the network and distributes the forwarding information to the NEs 870A-H of the data plane 880 over the south bound interface 882 (which may use the OpenFlow protocol). Thus, the network intelligence is centralized in the centralized control plane 876 executing on electronic devices that are typically separate from the NDs.

For example, where the special-purpose network device 802 is used in the data plane 880, each of the control communication and configuration module(s) 832A-R of the ND control plane 824 typically include a control agent that provides the VNE side of the south bound interface 882. In this case, the ND control plane 824 (the processor(s) 812 executing the control communication and configuration module(s) 832A-R) performs its responsibility for participating in controlling how data (e.g., packets) is to be routed (e.g., the next hop for the data and the outgoing physical NI for that data) through the control agent communicating with the centralized control plane 876 to receive the forwarding information (and in some cases, the reachability information) from the centralized reachability and forwarding information module 879 (it should be understood that in some embodiments of the invention, the control communication and configuration module(s) 832A-R, in addition to communicating with the centralized control plane 876, may also play some role in determining reachability and/or calculating forwarding information—albeit less so than in the case of a distributed approach; such embodiments are generally considered to fall under the centralized approach 874, but may also be considered a hybrid approach).

While the above example uses the special-purpose network device 802, the same centralized approach 874 can be implemented with the general purpose network device 804 (e.g., each of the VNE 860A-R performs its responsibility for controlling how data (e.g., packets) is to be routed (e.g., the next hop for the data and the outgoing physical NI for that data) by communicating with the centralized control plane 876 to receive the forwarding information (and in some cases, the reachability information) from the centralized reachability and forwarding information module 879; it should be understood that in some embodiments of the invention, the VNEs 860A-R, in addition to communicating with the centralized control plane 876, may also play some role in determining reachability and/or calculating forwarding information—albeit less so than in the case of a distributed approach) and the hybrid network device 806. In fact, the use of SDN techniques can enhance the NFV techniques typically used in the general-purpose network device 804 or hybrid network device 806 implementations as NFV is able to support SDN by providing an infrastructure upon which the SDN software can be run, and NFV and SDN both aim to make use of commodity server hardware and physical switches.

FIG. 8D also shows that the centralized control plane 876 has a north bound interface 884 to an application layer 886, in which resides application(s) 888. The centralized control plane 876 has the ability to form virtual networks 892 (sometimes referred to as a logical forwarding plane, network services, or overlay networks (with the NEs 870A-H of the data plane 880 being the underlay network)) for the application(s) 888. Thus, the centralized control plane 876 maintains a global view of all NDs and configured NEs/VNEs, and it maps the virtual networks to the underlying NDs efficiently (including maintaining these mappings as the physical network changes either through hardware (ND, link, or ND component) failure, addition, or removal). In the embodiments, the applications 888 can include control channel redirector 881, which implements any combination or collection of the functions described herein above with relation to the embodiments for control channel redirection and probing processes at the network devices and the controller.

While FIG. 8D shows the distributed approach 872 separate from the centralized approach 874, the effort of network control may be distributed differently or the two combined in certain embodiments of the invention. For example: 1) embodiments may generally use the centralized approach (SDN) 874, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 874, but may also be considered a hybrid approach.

While FIG. 8D illustrates the simple case where each of the NDs 800A-H implements a single NE 870A-H, it should be understood that the network control approaches described with reference to FIG. 8D also work for networks where one or more of the NDs 800A-H implement multiple VNEs (e.g., VNEs 830A-R, VNEs 860A-R, those in the hybrid network device 806). Alternatively or in addition, the network controller 878 may also emulate the implementation of multiple VNEs in a single ND. Specifically, instead of (or in addition to) implementing multiple VNEs in a single ND, the network controller 878 may present the implementation of a VNE/NE in a single ND as multiple VNEs in the virtual networks 892 (all in the same one of the virtual network(s) 892, each in different ones of the virtual network(s) 892, or some combination). For example, the network controller 878 may cause an ND to implement a single VNE (a NE) in the underlay network, and then logically divide up the resources of that NE within the centralized control plane 876 to present different VNEs in the virtual network(s) 892 (where these different VNEs in the overlay networks are sharing the resources of the single VNE/NE implementation on the ND in the underlay network).

Figure 8E:
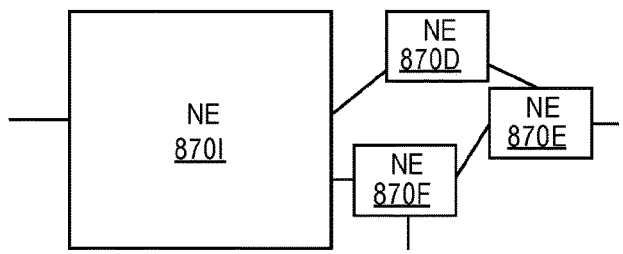
FIG. 8E illustrates the simple case of where each of the NDs implements a single NE, but a centralized control plane has abstracted multiple of the NEs in different NDs into (to represent) a single NE in one of the virtual network(s), according to some embodiments of the invention.
Figure 8F:
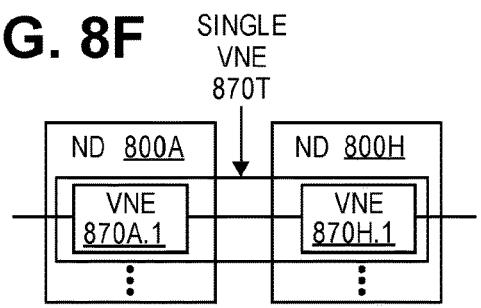
FIG. 8F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 8E and 8F respectively illustrate exemplary abstractions of NEs and VNEs that the network controller 878 may present as part of different ones of the virtual networks 892. FIG. 8E illustrates the simple case of where each of the NDs 800A-H implements a single NE 870A-H (see FIG. 8D), but the centralized control plane 876 has abstracted multiple of the NEs in different NDs (the NEs 870A-C and G-H) into (to represent) a single NE 8701 in one of the virtual network(s) 892 of FIG. 8D, according to some embodiments of the invention. FIG. 8E shows that in this virtual network, the NE 8701 is coupled to NE 870D and 870F, which are both still coupled to NE 870E.

FIG. 8F illustrates a case where multiple VNEs (VNE 870A.1 and VNE 870H.1) are implemented on different NDs (ND 800A and ND 800H) and are coupled to each other, and where the centralized control plane 876 has abstracted these multiple VNEs such that they appear as a single VNE 870T within one of the virtual networks 892 of FIG. 8D, according to some embodiments of the invention. Thus, the abstraction of a NE or VNE can span multiple NDs.

While some embodiments of the invention implement the centralized control plane 876 as a single entity (e.g., a single instance of software running on a single electronic device), alternative embodiments may spread the functionality across multiple entities for redundancy and/or scalability purposes (e.g., multiple instances of software running on different electronic devices).

Figure 9:
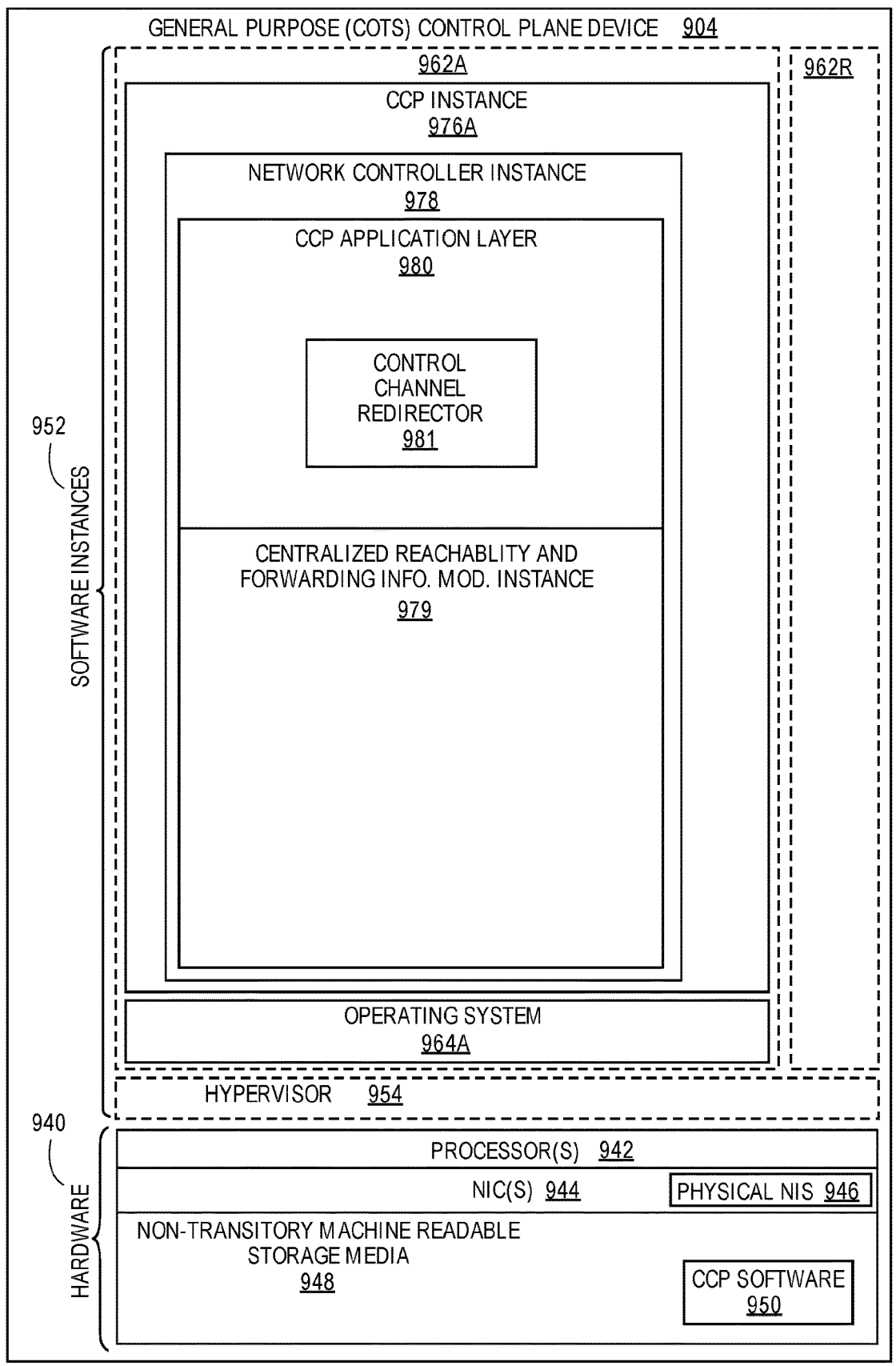
FIG. 9 illustrates a general-purpose control plane device with centralized control plane (CCP) software 950), according to some embodiments of the invention.

Similar to the network device implementations, the electronic device(s) running the centralized control plane 876, and thus the network controller 878 including the centralized reachability and forwarding information module 879, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 9 illustrates, a general-purpose control plane device 904 including hardware 940 comprising a set of one or more processor(s) 942 (which are often COTS processors) and physical NIs 946, as well as non-transitory machine-readable storage media 948 having stored therein centralized control plane (CCP) software 950.

In embodiments that use compute virtualization, the processor(s) 942 typically execute software to instantiate a virtualization layer 954 (e.g., in one embodiment the virtualization layer 954 represents the kernel of an operating system (or a shim executing on a base operating system) that allows for the creation of multiple instances 962A-R called software containers (representing separate user spaces and also called virtualization engines, virtual private servers, or jails) that may each be used to execute a set of one or more applications; in another embodiment the virtualization layer 954 represents a hypervisor (sometimes referred to as a virtual machine monitor (VMM)) or a hypervisor executing on top of a host operating system, and an application is run on top of a guest operating system within an instance 962A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 940, directly on a hypervisor represented by virtualization layer 954 (in which case the unikernel is sometimes described as running within a LibOS virtual machine), or in a software container represented by one of instances 962A-R). Again, in embodiments where compute virtualization is used, during operation an instance of the CCP software 950 (illustrated as CCP instance 976A) is executed (e.g., within the instance 962A) on the virtualization layer 954. In embodiments where compute virtualization is not used, the CCP instance 976A is executed, as a unikernel or on top of a host operating system, on the "bare metal" general purpose control plane device 904. The instantiation of the CCP instance 976A, as well as the virtualization layer 954 and instances 962A-R if implemented, are collectively referred to as software instance(s) 952.

In some embodiments, the CCP instance 976A includes a network controller instance 978. The network controller instance 978 includes a centralized reachability and forwarding information module instance 979 (which is a middleware layer providing the context of the network controller 878 to the operating system and communicating with the various NEs), and an CCP application layer 980 (sometimes referred to as an application layer) over the middleware layer (providing the intelligence required for various network operations such as protocols, network situational awareness, and user—interfaces). At a more abstract level, this CCP application layer 980 within the centralized control plane 876 works with virtual network view(s) (logical view(s) of the network) and the middleware layer provides the conversion from the virtual networks to the physical view. In the embodiments, the applications layer 980 can include control channel redirector 981, which implements any combination or collection of the functions described herein above with relation to the embodiments for control channel redirection and probing processes at the network devices and the controller.

The centralized control plane 876 transmits relevant messages to the data plane 880 based on CCP application layer 980 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 880 may receive different messages, and thus different forwarding information. The data plane 880 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 880, the packet (or a subset of the packet header and content) is typically forwarded to the centralized control plane 876. The centralized control plane 876 will then program forwarding table entries into the data plane 880 to accommodate packets belonging to the flow of the unknown packet. Once a specific forwarding table entry has been programmed into the data plane 880 by the centralized control plane 876, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method for automatic redirection of control channel messages in response to a control channel failure with a target switch in a software defined networking (SDN) network, the automatic redirection occurring before a topology of the SDN network is updated in response to the control channel failure, the method comprising:
    determining, by a processor, whether a control channel message is to be sent to an SDN controller;
    checking, by the processor, availability of the control channel;
    selecting, by the processor, a backup port to reach the SDN controller in response to the control channel being unavailable due to a failure along a path to the SDN controller;
    encapsulating, by the processor, the control channel message to include the source Internet Protocol address of the target switch;
    forwarding, by the processor, the control channel message to the SDN controller via the backup port; and
    receiving at least one received control channel message from the SDN controller via the backup port, the received control channel message being received in response to the forwarded control channel message.

2. The method of claim 1, further comprising:
    receiving configuration from the SDN controller to select a different backup port to improve routing of control channel messages to the SDN controller.

3. A network device to implement a method for automatic redirection of control channel messages in response to a control channel failure with a target switch in a software defined networking (SDN) network, the automatic redirection occurring before a topology of the SDN network is updated in response to the control channel failure, the network device comprising:
    a non-transitory computer-readable medium having stored therein a control channel redirector; and
    a processor coupled to the non-transitory computer-readable medium, the processor configured to execute the control channel redirector, the control channel redirector to determine whether a control channel message is to be sent to an SDN controller, to check availability of the control channel, to select a backup port to reach the SDN controller in response to the control channel being unavailable due to a failure along a path to the SDN controller, encapsulate the control channel message to include the source Internet Protocol address of the target switch, to forward the control channel message to the SDN controller via the backup port, and to receive at least one received control channel message from the SDN controller via the backup port, the received control channel message being received in response to the forwarded control channel message.

4. The network device of claim 3, wherein the control channel redirector is further configured to receive configuration from the SDN controller to select a different backup port to improve routing of control channel messages to the SDN controller.

5. A computing device to implement a plurality of virtual machines, the plurality of virtual machines to implement network function virtualization (NFV), where at least one virtual machine from the plurality of virtual machines implements a method for automatic redirection of control channel messages in response to a control channel failure with a target switch in a software defined networking (SDN) network, the automatic redirection occurring before a topology of the SDN network is updated in response to the control channel failure, the computing device comprising:
    a non-transitory computer-readable medium having stored therein a control channel redirector; and
    a processor coupled to the non-transitory computer-readable medium, the processor configured to the at least one virtual machine, the at least one virtual machine to execute the control channel redirector, the control channel redirector to determine whether a control channel message is to be sent to an SDN controller, to check availability of the control channel, to select a backup port to reach the SDN controller in response to the control channel being unavailable due to a failure along a path to the SDN controller, encapsulate the control channel message to include the source Internet Protocol address of the target switch, and to forward the control channel message to the SDN controller via the backup port, to receive at least one received control channel message from the SDN controller via the backup port, the received control channel message being received in response to the forwarded control channel message.

6. The computing device of claim 5, wherein the control channel redirector is further configured to receive configuration from the SDN controller to select a different backup port to improve routing of control channel messages to the SDN controller.

7. A control plane device in communication with a plurality of data plane nodes in a software defined networking (SDN) network, the control plane device to implement a method for automatic redirection of control channel messages in response to a control channel failure with a target switch in the SDN network, the automatic redirection occurring before a topology of the SDN network is updated in response to the control channel failure, the control device comprising:
    a non-transitory computer-readable medium having stored therein a control channel redirector; and
    a processor coupled to the non-transitory computer-readable medium, the processor configured to execute the control channel redirector, the control channel redirector to configure the plurality of nodes to have a set of backup ports to forward control channel messages in response to a detected failure of a primary control channel with the control plane device due to a failure along a path to the SDN controller, to configure the plurality of nodes to handle a backup switch role by forwarding received control channel messages destined for the control plane device to the control plane device via a control port of the back switch, and to configure the plurality of data plane nodes to handle inbound control channel messages from the control plane device by forwarding the inbound control channel messages to destination data plane nodes;

said control channel redirector being further configured to determine whether a control channel message is to be sent to the SDN controller, to check availability of the control channel, to select the backup port to reach the SDN controller in response to the control channel being unavailable due to the failure along the path to the SDN controller, to encapsulate the control channel message to include the source Internet Protocol address of the target switch, to forward the control channel message to the SDN controller via the backup port, and to receive at least one received control channel message from the SDN controller via the backup port, the received control channel message being received in response to the forwarded control channel message.

8. The control plane device of claim 7, wherein the control channel redirector is further configured to derive a control channel redirection path in response to receiving indicators of control channel redirection.

9. The control plane device of claim 7, wherein the control channel redirector is further configured to updated redirection of control channel messages in the plurality of data plane nodes in response to analysis of derived control channel redirection path information.

10. The control plane device of claim 7, wherein the control channel redirector is further configured to receive configuration from the SDN controller to select a different backup port to improve routing of control channel messages to the SDN controller.

* * * * *